INVENTOR.
ARTURO ALFRED LA CHIUSA
By Miketta, Glenny, Poms & Smith
ATTORNEYS.

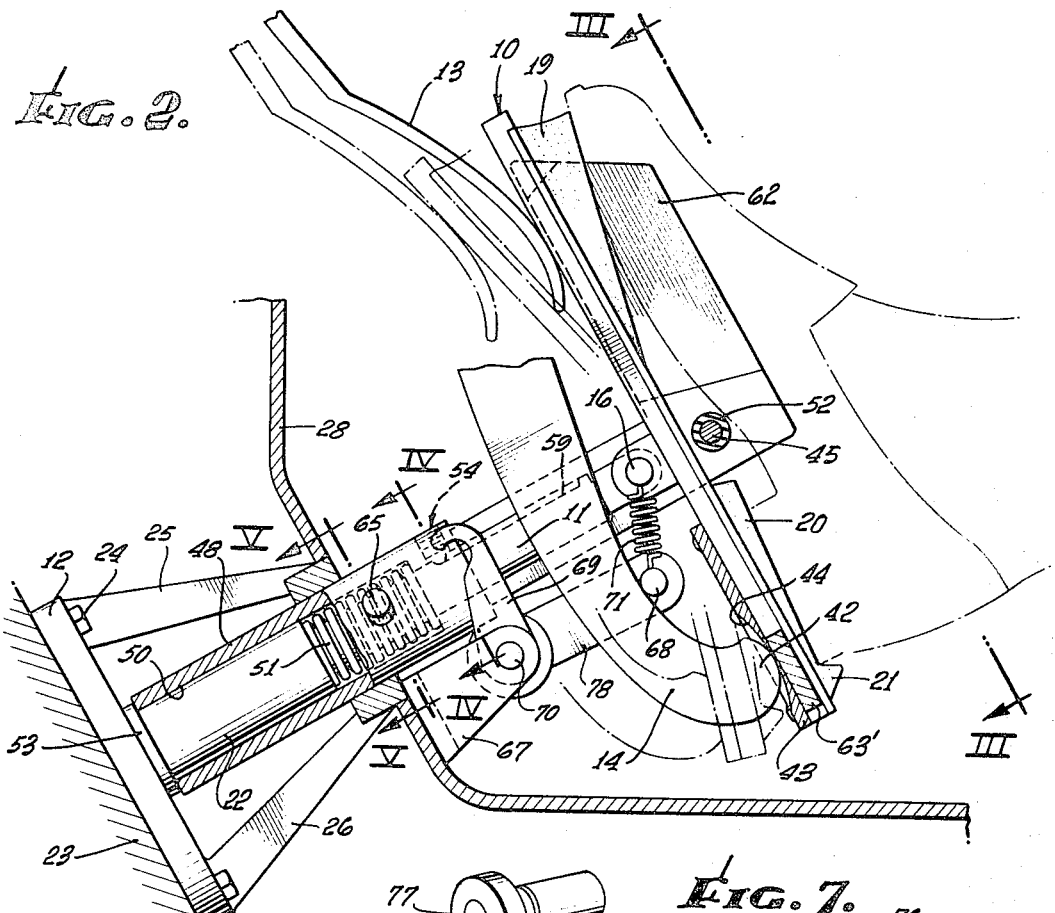
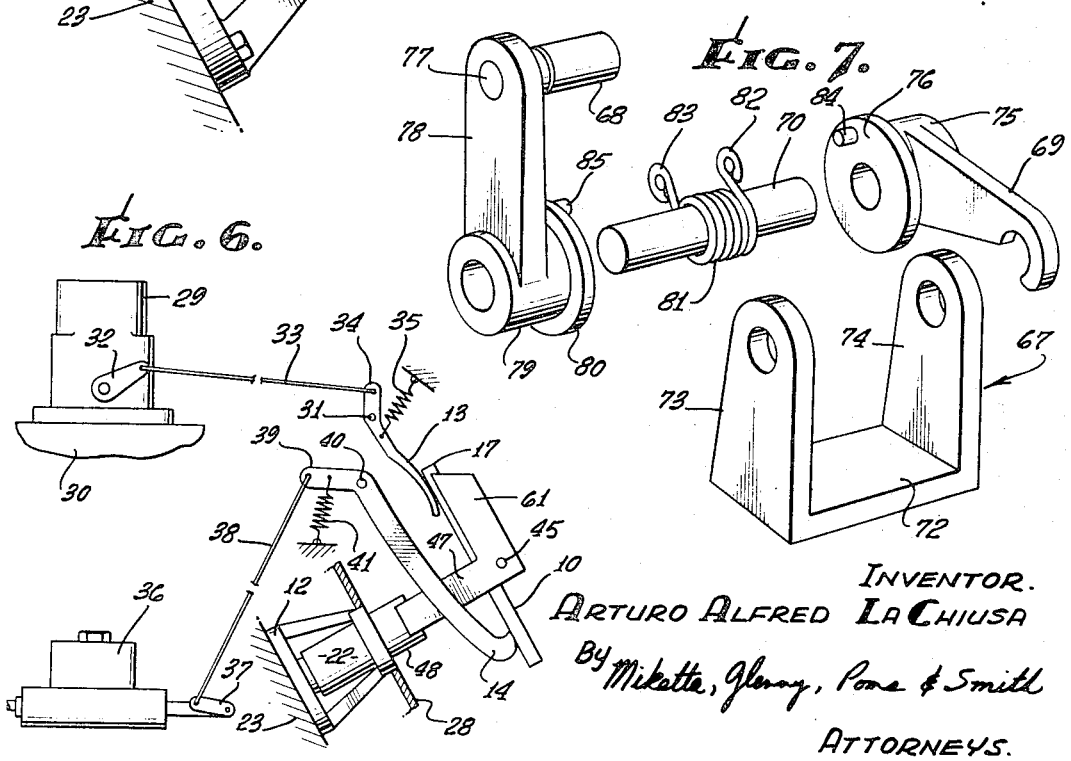

United States Patent Office 3,436,981
Patented Apr. 8, 1969

3,436,981
FOOT-OPERATED CONTROL FOR MOTOR DRIVEN VEHICLES
Arturo Alfred La Chiusa, Los Angeles, Calif., assignor to Auto-Safe Research and Development Corporation, a corporation of New York
Filed Feb. 23, 1967, Ser. No. 617,892
Int. Cl. G05g 9/02
U.S. Cl. 74—478.5                                    5 Claims

ABSTRACT OF THE DISCLOSURE

A foot pedal pivotally mounted at its approximate longitudinal midpoint upon a stationary mounting shaft is adapted to actuate a vehicle accelerator lever by depression of the toe end of the pedal and a braking means lever by depression of the heel end of the pedal; a foot supporting cross-bar is mounted for generally vertical movement directly above and parallel to the pivotal axis of the foot pedal and is upwardly biased away from the pedal under the influence of spring means associated with its mounting means, the crossbar providing suppor at the operator's foot arch over the pivotal axis of the pedal; and means normally biasing the vehicle braking means into a brake applied position are associated with the foot supporting crossbar to cause release of the brake means upon depression of the crossbar subject to subsequent actuation thereby through operation of the brake lever under the heel portion of the foot pedal.

BACKGROUND OF THE INVENTION

This invention relates generally to foot-operated controls employed in moving vehicles, such as automobiles, for controlling the operation of the vehicle motor carburetor means through operation of the associated accelerator lever and for controlling the operation of the vehicle brake means through an associated brake lever. More particularly, the present invention relates to the provision of a single pivoted foot pedal for operating both accelerator and brake levers employed in moving vehicles, such as automobiles, which is provided with a movable foot supporting means to support the operator's foot above the foot pedal and for releasing means associated therewith for normally holding the brake means of the vehicle in a brake applied position.

In conventional vehicle foot-operated controls presently employed in automobiles, and the like, a first pedal is employed for operating the vehicle accelerator lever while a second pedal is provided for operating the vehicle brake means. In an emergency, the operator must remove his foot from the accelerator pedal, transfer it through space to the brake pedal and then depress the brake pedal until the brakes are applied. The time consumed for such operation is normally termed the operator's reaction time which varies between different individuals depending upon their age and reflexes. When a vehicle is travelling at high speed, it can cover considerable distance during this reaction time when the operator is hopelessly committed to forward movement until the can get his foot upon the brakes. The time consumed for movement of the operator's foot from the accelerator to the brake pedal is a major portion of the so-called reaction time it takes to apply the brakes after the operator is aware of the emergency or dangerous condition requiring stopping of his vehicle. Many accidents could be avoided if the reaction time required for the application of a braking system associated with the vehicle could be considerably reduced. It is therefore the principal object of the present invention to disclosed and provide a foot-operated control which greatly reduce the reaction time necessary for the operator to actuate the vehicle braking means when he is driving along with his foot controlling the vehicle accelerator lever.

It is another object of the present invention to disclose and provide a foot-operated control as in the foregoing principal object wherein a single foot-operated pivoted pedal may be operated, without need for the operator's removal of his foot therefrom, to control both accelerator and brake levers by the single pedal, the brake means being readily applicable in an absolute minimum of required reaction time.

In my prior United States Letters Patent Nos. 3,205,983 and 3,287,989, a foot-operated control is disclosed for operating a vehicle's carburetor means, brake means and transmission by a single pedal pivotally mounted upon a vertically movable control shaft. In these prior patents, the brake means associated with the vehicle are controlled by the vertical movement of the control shaft mounting the pedal while pivotal movement of the pedal controls the carburetor and transmission means. In the present invention, it is intended to decrease the reaction time required for applying the associated brake means, to control the brake means in response to heel depression of the operator's foot on the pedal employed for controlling the accelerator and to provide a pedal control which is mounted upon a stationary shaft allowing actuation of the brake means by a minimal travel of the operator's heel in depressing the heel portion of the pedal. Also, in the present invention, the transmission means associated with the vehicle may be operated in conventional manner by a hand-operated shift or gear selector lever.

It is a still further object of the present invention to disclose and provide a foot-operated control with foot supporting means for supporting the operator's foot over the pivoted pedal and means associated therewith for normally applying the vehicle brake means when the control is in a starting or non vehicle operating position but which release the brake means upon placing of the control in an operative position preparatory to operation of the vehicle under the control of the operator's actuation of the accelerator and brake levers under the single pivoted foot pedal.

SUMMARY OF THE INVENTION

Generally stated, the foot-operated control for operator accelerator and braking means of a motor drive vehicle through pivotal movement of the vehicle operator's foot on a single pedal, according to the present invention, includes the provision of a foot pedal and means for pivotally mounting the pedal intermediate its ends upon a stationary support. An accelerator lever associated with the vehicle motor is mounted for actuation thereof by pivotal movement of a first, preferably the toe, end of the pedal. A brake lever associated with the vehicle braking means is mounted for actuation by pivotal movement of a second end, preferably the heel end, of the pedal. The vehicle may therefore be accelerated or braked by selectable pivotal movement of a single foot pedal.

Foot supporting means are provided, according to the present invention, to support the operator's foot at the general area of the foot arch directly above the foot pedal pivotal axis allowing the operator to pivot his foot forwardly and backwardly on the support to selectively depress the forward or rearward ends of the pivoted foot pedal. As particularly contemplated within the present invention, means are provided for normally biasing the brake lever into a brake applied position. Foot-operated lever means are provided for overcoming the bias of such means to release the brake lever from the brake applied position upon operation of the foot-operated control into an operative position preparatory for controlling operation of the vehicle carburetor and brake means.

Such foot-operated level means is preferably associated with the foot supporting means employed to support the operator's foot over the pivoted foot pedal.

The foot-operated control for operating the accelerator and braking means of a motor driven vehicle, according to the present invention, will be better understood by, and various additional objects and advantages of the foot-operated control according to the present invention will become apparent to those skilled in the art from a consideration of the following detailed description of the construction and mode of operation of a preferred exemplary embodiment of the control of the present invention. In making such detailed description of the preferred exemplary embodiment of the present foot-operated control, reference will be made to the appended sheets of drawings in which:

FIG. 2 is an elevational view of the foot-operated control of FIG. 1 showing the control in its operated position;

FIG. 6 is a schematic representation of the foot-operated control of FIGS. 1 through 5 associated with exemplary carburetor means and a power operated master brake cylinder or braking means; and FIG. 7 is a detail perspective view of a portion of the foot-operated control of FIGS. 1 through 5.

Figure 1:
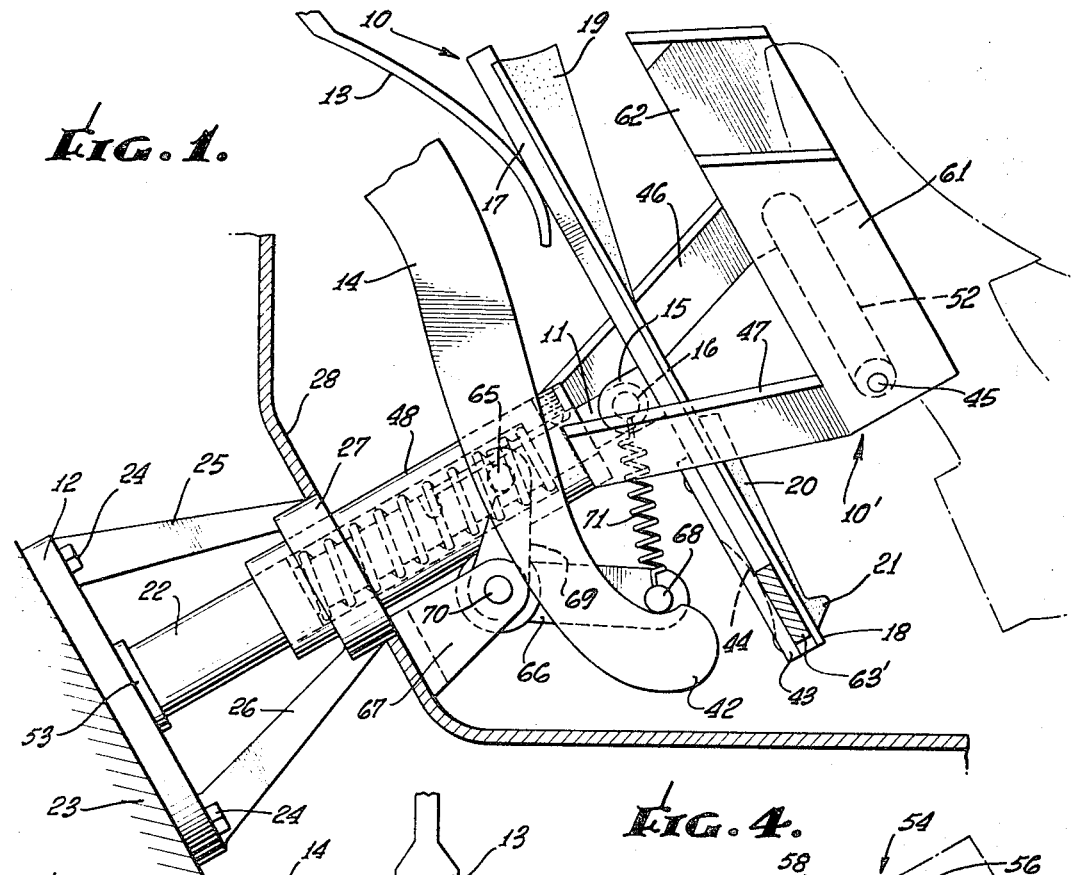
FIG. 1 is an elevational view of a preferred exemplary embodiment of foot-operated control for operating accelerator and braking means of a motor driven vehicle, through pivotal movement of the vehicle operator's foot on a single foot pedal beneath a foot positioning and brake releasing means, the control being shown in its fully raised, starting position.

Referring particularly to FIG. 1, the preferred exemplary embodiment of foot-operated control, according to the present invention, includes generally a foot-operated pedal 10 pivotally mounted upon a stationary shaft 11 fixed to a vehicle frame mounted support 12 to selectively operate an accelerator lever 13 associated with the vehicle motor means and a brake lever 14 associated with the vehicle braking means which are preferably of the power operated type. Foot supporting means are provided at 10' to support the operator's foot above the foot pedal 10 during operation, as seen in FIG. 2, and which, in the preferred exemplary embodiment, is associated with the powered braking means and parking brake means of the vehicle as hereinafter described in detail.

Figure 3:
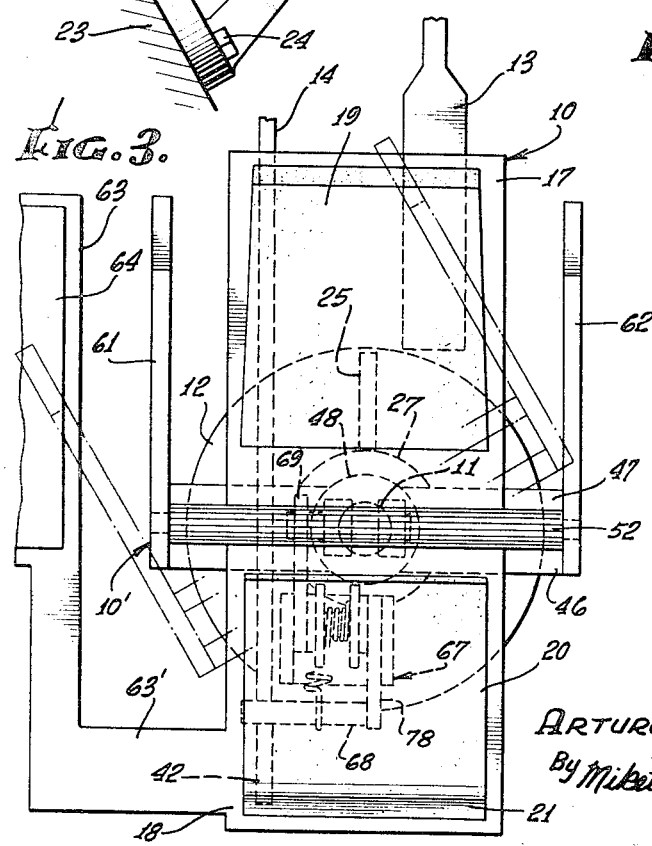
FIG. 3 is a plan view of the foot-operated control of FIG. 2 taken therein along the plane III—III.

Foot pedal 10, as been seen in FIGS. 1, 2 and 3, is pivotally mounted at its approximate longitudinal midpoint on the upper end of stationary two-diameter shaft 11 by means of a pair of depending brackets or flanges, as flange 15 in FIG. 1, journaled on laterally extending pins secured to the upper end of shaft 11, as pin 16 in FIG. 1. Pedal 10 is provided with a first end 17 to be depressed by the toe of the operator's foot and a second end 18 to be depressed by the heel portion of the operator's foot. The toe or first end 17 of pedal 10 may be provided with an inclined toe pad 19 made of any suitable material, such as a nonskid rubber. Similarly, the heel or second end 18 of pedal 10 may be provided with a heel pad 20 including a heel retaining lip 21 to receive and facilitate positioning of the operator's heel on the pedal heel end 18. Heel cushion 20 may be made of a nonskid rubber material as toe pad 19. This heel pad 20 may be adjustably positioned upon the second end 18 of pedal 10, as by conventionally used adjustable fasteners, to allow longitudinal positioning of the heel pad upon the pedal 10 to accommodate the vehicle owner's particular size of foot.

Stationary shaft 11 may be secured by its lower end 22 to the support base 12 by any conventional manner, as by bolt means or welding. Base support 12 in turn is secured to a structural or frame member 23 of the vehicle by a plurality of bolts 24. Base support 12 may be formed out of an integral casting having a round or other configured base with at least two, and preferably three or four, upwardly convergent legs, as legs 25 and 26 in FIGS. 1 and 2, terminating in a preferably integrally formed generally circular journal position flush with the floorboards 28 of the vehicle. While some lateral stability is provided by journal 27 to the foot pedal stationary support 11, as subsequently described, journal 27 is principally intended to function as part of a supporting means for the exemplary foot supporting crossbar means indicated generally 10', as will hereinafter be explained.

The foot-operated control, thus far explained in detail, is adapted to control associated carburetor means of the vehicle through the accelerator lever 13 and braking means of the vehicle through the associated brake lever 14 by pivotal movement of the single pedal 10. Referring specifically to FIG. 6, a conventional accelerator lever connection to a carburetor means 29 of a vehicle motor 30 is shown schematically. As in conventional installations, accelerator lever 13 may be pivotally mounted at 31 to a stationary support to actuate carburetor linkage 32 by way of rod 33 connected to the upper free end 34 of the lever. It can be seen that depression of the first or toe end 17 of pedal 10 on lever 13, against the conventional spring bias of the accelerator lever 13, provided as by a spring means 35, will cause operation of the carburetor means of the vehicle to accelerate the associated motor means.

Brake lever 14, as shown schematically in FIG. 6, is also intended to be associated with conventional braking means, which preferably are of the power assisted or operated type optionally available on presently available automobiles. Brake lever 14 is connected to the vehicle braking means, such as the master brake cylinder means 36 through linkage 37, rod 38 and the lever free end 39, lever 14 being pivoted at 40 to a stationary support. As in conventional brake lever installations in present automobiles, an upward bias of the lever 14 is provided by spring means 41. From the description of the foot control of FIGS. 1 and 2 thus far made and as can be seen in the schematic representation thereof of FIG. 6, depression of the heel portion or second end 18 of foot pedal 10 downwardly on brake lever 14, in the preferred exemplary embodiment, causes actuation of the braking means associated with the vehicle which, as stated previously, is preferably of the power assisted type. Such power assist means for braking systems are conventional and are therefore not illustrated in addition to the schematic representation of the master brake cylinder shown in FIG. 6.

It is contemplated within the present invention that a preexisting vehicle braking and carburetor system can be readily adapted to be operated by the exemplary foot-operated control through addition of the foot-operated control to the vehicle and only slight adjustments of the accelerator lever and brake levers associated therewith. For example, as seen in FIG. 3, the foot-operated control according to the present invention could be installed in a vehicle in a position to replace a pre-existing accelerator pedal to place the new pedal toe end 17 over the lower end of an accelerator lever 13. In some new automobiles, the accelerator lever is actually a rod with an enlarged ball upper end which fastens into the forward end of the accelerator pedal. Such a connection between the forward end 17 of the exemplary foot pedal to a rod-type accelerator lever could easily be provided. As in present conventional automotive installations, the brake lever 14 is spaced to the left of the accelerator lever 13, as shown in FIG. 3. It is contemplated within the present invention that such existing brake levers could be extended, as by lever 14 in the preferred exemplary embodiment, to present a generally rounded end beneath the second or heel end 18 of pedal 10. As seen in FIGS. 1 and 2, the heel end 18 of pedal 10 may be provided with a guide plate 43 having a curved slot 44 to receive the end 42 of brake lever 14 when in the operated position of FIG. 2.

Figure 4:
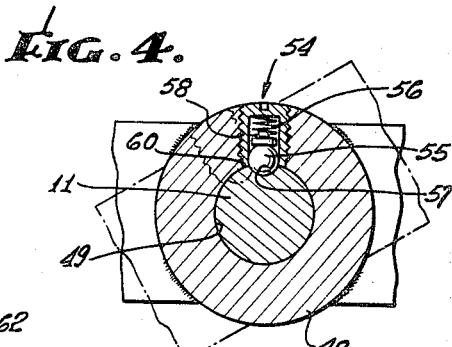
FIG. 4 is a section view of a portion of the foot-operated control of FIG. 2 taken therein along the plane IV—IV.
Figure 5:
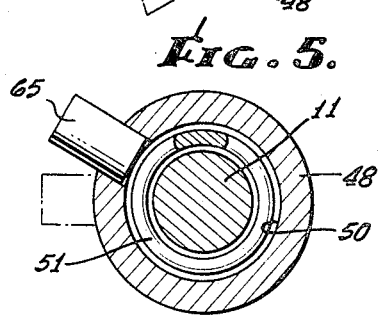
FIG. 5 is a section view of a portion of the foot-operated control of FIG. 2 taken therein along the plane V—V.

Foot supporting means are provided to support the operator's foot at the general area of the foot arch directly above the foot pedal pivot point, to the axis of pin 16, while allowing forward and backward tipping of the operator's foot thereon to allow selective operation of the accelerator lever 13 under the toe portion 17 or the brake lever 14 under the heel portion 18 of pedal 10. In the preferred exemplary embodiment, such foot supporting means includes the provision of a crossbar 45 mounted upon a yoke or frame including arms 46 and 47, fixed to the upper end of a sleeve 48. Sleeve 48 is provided with an internal bore 49 at its upper end, as seen in FIG. 4, to slidably fit about the stationary shaft 11 to which foot pedal 10 is pivotally mounted. Below its upper end, sleeve 48 is provided with an enlarged bore portion 50, as seen in FIGS. 1, 2 and 5, which fits snugly about and slides upon the lower base portion 22 of stationary shaft 11. Means are provided for normally biasing the crossbar 45 and its associated frame including legs 46 and 47, and sleeve 48, upwardly into the position of FIG. 1. In the preferred exemplary embodiment, such biasing means include the provision of the coil spring 51 about the stationary shaft 11, the lower end of spring means 51 seating upon the enlarged base portion 22 of stationary shaft 11 with the upper end of spring means 51 abutting the ledge formed within sleeve 48 at the juncture of inner bores 49 and 50.

Crossbar 45 is preferably provided with a rubber or other nonskid coating or sleeve 52 upon which the operator may rest and pivot his foot over the pivoted pedal 10. As seen in FIG. 2, when the foot support bar 45 has been fully depressed to bring the lower associated sleeve 48 down into abutment with the base flange 53 of the stationary shaft, the operator's foot is positioned directly over the toe and heel portions of the pedal, there being sufficient clearance between crossbar 45 and the pedal 10 to allow pivotal movement of the pedal therebelow. Means are provided for locking the crossbar 45 and its associated frame assembly down in the operating position of FIG. 2. As seen in FIGS. 1, 2, and particularly FIG. 4, spring biased detent means are provided to cooperate between sleeve 48 and stationary shaft 11 to hold the crossbar 45 in its depressed operative position of FIG. 2, as hereinafter explained.

Referring to FIGS. 2, 3 and 4, it can be seen that when the foot supporting means including the crossbar 45 are in a depressed operative position, spring biased detent means, indicated generally at 54, hold crossbar 45 parallel to the axis of the pivot pins, including pin 16, upon which the foot pedal 10 is pivoted. Referring particularly to FIG. 4, such spring biased detent means include the provision of a ball 55 biased by a spring 56 into a concave or semispherical depression or notch 57 provided in stationary shaft 11. An adjustment screw 58 is provided to adjust the spring tension. Stationary shaft 11, as best seen in FIG. 1, and in phantom line in FIG. 2, is provided with a vertical longitudinally extending slot 59 in which ball 55 may slide during vertical movement of the crossrod 45 and its associated mounting means. However, to place ball 55 within slot 59 in order to allow raising of the crossbar 45, bar 45 must be rotated counterclockwise from the position of FIG. 2 into the position of FIG. 1, the latter being seen in phantom line in FIG. 3. In so doing, ball 55 must be sprung over a lip 60 between recess 57 and slot 59. Adjustment screw 58 may be positioned to prevent sufficient clearance between the screw and ball 55 to allow raising of the supporting means including crossbar 45 without such counterclockwise rotation to allow sliding relative movement between ball 55 and slot 59. The foot supporting means, including crossbar 45, may also be provided with side lever or flange members 61 and 62 to assist the operator in rotating crossbar 45 by his foot to facilitate rotation of the crossbar 45 in a clockwise direction after depression from the raised position of FIG. 1 to the lowered operative position as seen in FIG. 2. Side flanges or levers 61 and 62 provided on the foot mounting means may also be covered with a rubber or nonskid surface against which the operator's foot is to be applied.

Foot pedal 10, in the preferred exemplary embodiment, is provided with a lateral extension, as best seen in FIGS. 1 and 3, at its heel or second end 18 to allow depression thereof by the operator's other, normally the left, foot. While it is anticipated that an operator can become accustomed to using the foot-operated control according to the present invention very quickly, there is a possibility that, either through force of habit or through unfamiliarity with the device, an operator might remove his foot from the control or fail to depress his heel initially in search for the brake pedal. The lateral extension or an additional pedal 63 on laterally extending arm 63' provides a brake pedal area in an expected location so that even persons unfamiliar with the device initially would not fail to apply braking action when needed. Lateral extension 63 also allows for dual braking action through the use of both of the operator's feet should the power assist mechanism associated with the braking means fail to assist braking. A nonskid pad or surface 64 is preferably provided on pedal extension 63 as on the pedal 10 itself.

Means are provided for normally biasing brake lever 14 into a lowered brake applied position when the foot operated control is not in use, which in the preferred exemplary embodiment, occurs when the control is placed in the position shown in FIG. 1. Such means for normally biasing the brake lever into a brake applied position include the provision of an actuator pin 65 on the upwardly biased sleeve 48, as seen in FIGS. 1, 2 and 5, which cooperates with a linkage 66 mounted upon a bracket 67 to depress the bottom end 42 of brake lever 14 by the brake lever abutting pin 68 secured to linkage 66. Linkage 66 has a hook end 69 positioned in the path of upward travel of pin 65 with sleeve 48 when the foot supporting means, indicated generally at 10', rises to the starting brake applied position of FIG. 1. As seen in FIG. 1, upward movement of pin 65 causes linkage 66 to rotate about pin 70 on bracket 66 to force the brake lever abutting pin 68 in a camming downward movement from the position of FIG. 2 to that of FIG. 1. Upon depression of the foot supporting means and its associated sleeve 48 into the position of FIG. 2, pin 65 is removed from the hook end 69 to linkage 66 and the linkage and associated pin 68 are pivoted upwardly under the spring bias of spring means 71 connected between linkage pin 68 and the laterally extending foot pedal pivoting pin 16, as seen in phantom line in FIG. 3. In such brake released position, upon the lowering of the foot supporting means, due to the depression thereof by the operator's foot on cross bar 45, the curved free end 42 of brake lever 14 is allowed to come into sliding abutment under the guide 43 of the heel end 18 of foot pedal 10. The brake means associated with brake lever 14 may then be optionally applied in selectable amounts by the extent of depression of the operator's heel upon the heel end of the pivoted pedal 10. It will be apparent to those skilled in the art from the foregoing, that upon counterclockwise rotation of the foot supporting means 45 and its release by the operator's foot, the upward bias of spring 51 will force sleeve 48, as well as the associated foot supporting means, upwardly bringing pin 65 under hook end 69 of linkage 66 to automatically apply the brake means associated with lever 14, the release of the foot supporting means including crossbar 45 causing actuation of the braking means lever into the brake applied position as seen in FIG. 1.

In automotive vehicles equipped with power assist mechanisms, commonly referred to as power brakes, the power assisting mechanism is inoperative when the engine of the vehicle is not operating. It is common to experience a further depression of the brake pedal under the operator's foot upon the turning on of the vehicle engine without the addition of force applied to the pedal by the operator's foot. The brake means and associated biasing means commonly employed in power brake systems resist depression of the brake lever until the power assist mechanism has been turned on. It is therefore contemplated that in the present exemplary embodiment of foot-operated control, that when the vehicle engine associated therewith is turned on and the power assist mechanism begins to operate, the brake lever 14 will automatically tend to be further depressed under the same biasing means applied by the control. With the control mechanism in the brake applied position of FIG. 1, further depression of the free end 42 of the brake lever may not be readily obtainable to further upward raising movement of the foot supporting means upon which pin 65 is mounted. It is therefore contemplated within the present invention that the linkage mechanism 66 be provided with means for causing further depression of lever 14 upon actuation of the power assist mechanism associated with the vehicle braking means without the need for having a further upward movement of the foot supporting means. Referring particularly to FIG. 7, an exemplary embodiment of linkage means 66 is shown for accomplishing such further depression of brake lever 14 upon turning on the vehicle engine and the associated power assist mechanism. Bracket 67 includes a base 72 and a pair of upstanding side flanges 73 and 74. The linkage hook end 69 is preferably formed integrally with a sleeve 75 having an inner flange 76. Brake lever abutting pin 68 may be rotatably journaled by a pin 77 to a linkage arm 78 formed integrally with a sleeve 79. Sleeve 79 may also be provided with a flange 80. A torsion spring 81 is mounted upon the pivot pin 70 with hook or eye ends 82 and 83 to be engaged by the pins 84 and 85, respectively, on flanges 76 and 80 when sleeves 75 and 79 are mounted between bracket arms 73 and 74 on pivot pin 70. From the foregoing detailed description of the linkage means, it can be seen that proper assembly of the linkage arms 69 and 78 to bracket 72 and pivot pin 70 with the torsion spring 81 under torsion, hook arm 69 will continue to bias the brake lever 14 downward in FIG. 1 even when the associated sleeve 48 of the foot supporting means is in its fully raised position. Therefore, upon turning on the vehicle engine and actuation of the power assist mechanism, the brake lever 14 can be immediately urged further downward with the assistance of the power mechanism under the bias of torsion spring 81 acting through the hold-down or hook lever 69 of mechanism 66.

It is also contemplated within the present invention that the foot operated control as herein disclosed can be associated with conventional parking brake mechanisms to cause application and release of a parking brake concurrently with the application and release of the foot or, preferably power assisted, braking means of the vehicle. A parking brake linkage can be associated with the movement of the foot supporting means sleeve 48 to an additional pin, as pin 65 cooperating therewith, or through the already provided linkage 66. It is contemplated that on release and raising movement of the foot-operated control into the position of FIG. 1, that a parking brake would be applied concurrently with the actuation of the brake means of lever 14. Such parking brake mechanism could similarly be released concurrently with the release of lever 14. It is also contemplated that in automobiles having an automatic transmission, that means be provided to prevent movement of the gear selector lever from parking and neutral positions to any of the reverse, drive or low positions until after the foot-operated control has been rendered operative through the depression of the traverse or crossbar 45 from the position of FIG. 1 to the position of FIG. 2.

From the foregoing detailed description of a preferred exemplary embodiment of the foot-operated control for operating accelerator and braking means of a motor driven vehicle, according to the present invention, it can be seen that the reaction time normally required for shifting the operator's foot from an accelerator pedal to a brake pedal is obviated. In the case of an emergency, the operator need not lift his foot from the present control, but rather, need only pivotally depress the heel portion of pedal 10 without having to raise the foot from the foot supported crossbar 45. Further, the operator's foot is positioned and supported in a convenient location above the pivoted pedal 10 in the preferred exemplary embodiment to facilitate application of toe and heel pressure on pedal 10.

From the foregoing detailed description of the preferred exemplary embodiment of foot-operated control according to the present invention, it should be apparent to those skilled in the art that the foregoing objects and advantages specified herein have been attained by the present invention. Mechanically actuated brake means of a motor operated vehicle are applied automatically on positioning the foot-operated control in a released nonoperating position as shown in FIG. 1. Upon turning on the vehicle ignition system and starting the engine, as well as the power assist mechanism, the power brake means will be actuated with the aid of the power assist mechanism due to the depression of pin 68 on brake lever 14 under the bias of the torsion spring 81 of the exemplary linkage means of FIG. 7. It is contemplated that at this stage in the starting of a driving operation, the hand operated gear lever cannot as yet be moved into a position other than the park and/or neutral positions. The operator then places his foot upon the foot supporting means crossbar 45 and presses the crossbar downwardly until the associated sleeve 48 abuts the base flange 53 therebelow, as seen in FIG. 2. The operator then rotates the depressed foot supporting means in a clockwise direction, by applying lateral foot pressure to the right side flange 62 to move the detent means into the holddown or locking recess 57 as seen in FIG. 4, the foot control being then in the operative position of FIG. 2. In so depressing the foot supporting mechanism into the foot supported position of FIG. 2, the associated vehicle braking means, preferably power assisted, is released as well as any associated parking brake means. The operator may then place the gear selector lever in a drive or other position, other than parking or neutral, and proceed to operate the pivoted pedal 10 to accelerate or brake the vehicel.

Having thus described a preferred exemplary embodiment of the foot-operated control, according to the present invention, it should be noted that the foregoing detailed description is intended to be exemplary in nature only and that the control according to the present invention may be employed in alternative embodiments and constructions within the scope of the present invention which is defined and limited only by the following claims.

I claim:

1. A foot operated control for operating accelerator and braking means of a motor driven vehicle through pivotal movement of the vehicle operator's foot on a single pedal, said control comprising:

a foot pedal and means for pivotally mounting said pedal intermediate its ends upon a stationary support;

an accelerator lever associated with the vehicle motor and means for mounting said accelerator lever for actuation thereof by pivotal movement of a first end of said pedal;

a brake lever associated with said vehicle braking means and means for mounting said brake lever for actuation thereof by pivotal movement of a second end of said pedal, said vehicle being thereby accelerated or braked by selectable pivotal movement of a single foot pedal;

means for normally biasing said brake lever into a brake applied position; and foot operated lever means for overcoming said last named means to release said brake lever from said brake applied position subject to the subsequent action thereon of said pedal second end.

2. The foot operated control of claim 1 wherein:
said foot operated means includes a foot rest crossbar and means for mounting said crossbar for upwardly biased vertical movement above said pedal with said crossbar extending across said pedal directly above its pivot axis to support said operator's foot thereon at the approximate area of the foot arch when in a fully depressed brake lever released position.

3. In a foot operated pedal control for operating vehicle motor and braking means, the improvement comprising the provision of:
a foot rest crossbar means for supporting an operator's foot at the general area of the foot arch; and
means for mounting said crossbar means above an associated pivoted foot pedal to allow actuation of said pedal by heel and toe depression about said crossbar means.

4. The improvement of claim 3 wherein:
said means for mounting said crossbar means mounts said crossbar for generally vertical movement relative to said pedal; and
brake lever actuating linkage means are provided in association with said means for mounting said crossbar for holding an associated brake lever in a brake applied position when said crossbar means is in a raised position, said brake lever being released from said brake applied position by said actuating linkage when said crossbar is depressed to a lowered position for subsequent actuation thereof by pivotal movement of said foot pedal.

5. The improvement of claim 4 wherein:
said brake lever actuating linkage means includes a first link portion to be actuated by movement of said means for mounting said crossbar means, a second link portion to engage and actuate said associated brake lever, means for pivotally mounting said link portions and torsion spring means operative between said first and second link portions to cause said second link portions to bias said associated brake lever toward said brake applied position when said first link portion is held in a stationary relation thereto.

References Cited

UNITED STATES PATENTS

| 2,033,433 | 3/1936 | Leupold | 74—478 XR |
| 2,078,324 | 4/1937 | Griffiths | 74—478 XR |
| 2,222,378 | 11/1940 | Smith | 192—3 XR |
| 2,499,280 | 2/1950 | Redmon | 74—478 |
| 2,554,954 | 5/1951 | Nickell | 192—3 |

HALL C. COE, *Primary Examiner.*

U.S. Cl. X.R.

74—513; 192—3